United States Patent
Mackenzie et al.

(10) Patent No.: US 10,457,132 B2
(45) Date of Patent: Oct. 29, 2019

(54) TWIN MOTOR DRIVE SYSTEM FOR HYBRID ELECTRIC VEHICLE

(71) Applicant: Ford Global Technologies, LLC, Dearborn, MI (US)

(72) Inventors: Kevin Mackenzie, Canton, MI (US); Thomas Joseph Ciccone, Madison Heights, MI (US); James William Dunham, Plymouth, MI (US); Adam Deibler, Livonia, MI (US); Kyle Mattinson, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 15/656,708

(22) Filed: Jul. 21, 2017

(65) Prior Publication Data

US 2019/0023115 A1   Jan. 24, 2019

(51) Int. Cl.

| | |
|---|---|
| *B60K 6/40* | (2007.10) |
| *B60K 6/24* | (2007.10) |
| *B60K 6/26* | (2007.10) |
| *B60K 6/42* | (2007.10) |
| *B60K 6/52* | (2007.10) |
| *F01M 11/00* | (2006.01) |

(Continued)

(52) U.S. Cl.
CPC ............. *B60K 6/40* (2013.01); *B60K 6/24* (2013.01); *B60K 6/26* (2013.01); *B60K 6/42* (2013.01); *B60K 6/52* (2013.01); *B60K 2006/266* (2013.01); *B60L 53/14* (2019.02); *B60L 58/12* (2019.02); *B60Y 2200/92* (2013.01); *F01M 11/0004* (2013.01); *F02F 7/0082* (2013.01); *Y10S 903/905* (2013.01); *Y10S 903/906* (2013.01); *Y10S 903/916* (2013.01)

(58) Field of Classification Search
CPC ... B60K 6/40; B60K 6/26; B60K 6/42; B60K 6/52; B60K 6/24; B60K 2006/266; F02F 7/0082; B60L 58/12; B60L 53/14; B60Y 2200/92; F01M 11/0004; Y10S 903/905; Y10S 903/906; Y10S 903/916
USPC ......................................................... 180/243
See application file for complete search history.

(56) References Cited

U.S. PATENT DOCUMENTS

| | | |
|---|---|---|
| 5,788,005 A | 8/1998 | Arai |
| 6,116,364 A | 9/2000 | Taguchi et al. |

(Continued)

FOREIGN PATENT DOCUMENTS

| | | | |
|---|---|---|---|
| DE | 2929497 A1 | 2/1981 | |
| DE | 202011002194 U1 | 5/2011 | |
| JP | 11099838 A * | 4/1999 | ............... B60K 6/52 |

*Primary Examiner* — Tony H Winner
*Assistant Examiner* — Felicia L. Brittman
(74) *Attorney, Agent, or Firm* — David Kelley; McCoy Russell LLP (57) ABSTRACT

Methods and systems are provided for a hybrid electric vehicle including a front-wheel drive system and a rear-wheel drive system. In one example, the rear-wheel drive system includes an internal combustion engine configured to drive rear wheels of the vehicle, and the front-wheel drive system includes a first electric motor and a second electric motor mounted directly to opposing sides of the engine. The first electric motor is coupled to a first reduction gearbox to drive a first front wheel of the vehicle, and the second electric motor is coupled to a second reduction gearbox to drive a second front wheel of the vehicle.

20 Claims, 7 Drawing Sheets

(51) Int. Cl.
*F02F 7/00* (2006.01)
*B60L 53/14* (2019.01)
*B60L 58/12* (2019.01)

(56) References Cited

U.S. PATENT DOCUMENTS

| | | |
|---|---|---|
| 6,880,654 B2 | 4/2005 | Plishner |
| 7,384,357 B2 | 6/2008 | Thomas et al. |
| 7,908,067 B2 | 3/2011 | Soliman et al. |
| 9,457,671 B2 | 10/2016 | Manganaro |
| 2006/0037792 A1 | 2/2006 | Boss et al. |
| 2008/0223633 A1* | 9/2008 | Kim .................. B60K 6/48 180/65.265 |
| 2009/0261762 A1* | 10/2009 | Tsuchiya ............... B60L 3/0046 318/400.3 |
| 2011/0276241 A1* | 11/2011 | Nakao ................... B60L 50/16 701/69 |
| 2012/0303199 A1* | 11/2012 | Oba ...................... B60K 6/445 701/22 |
| 2017/0050536 A1 | 2/2017 | Martin |

* cited by examiner

TWIN MOTOR DRIVE SYSTEM FOR HYBRID ELECTRIC VEHICLE

FIELD

The present description relates generally to methods and systems for hybrid electric vehicles including a front-wheel drive system and a rear-wheel drive system.

BACKGROUND/SUMMARY

A motorized vehicle may include an all-wheel drive system configured to provide torque to wheels positioned at each end of the vehicle. The all-wheel drive system may increase wheel traction with a ground surface on which vehicle sits to increase acceleration and decrease wheel slippage. In some examples, each wheel may the be driven by an internal combustion engine of the vehicle. In order to drive each wheel, torque produced by the engine may be received by a transmission of the vehicle. An output of the transmission is coupled to a transfer case in order to provide the torque to one or more drive shafts coupled to the transfer case. However, in vehicles having a smaller amount of space for drivetrain components, packaging the components of an all-wheel drive system may be difficult. As a result, some vehicles may include wheels driven by a different type of motor, such as an electric motor.

One example approach of an all-wheel drive system is shown by Plishner in U.S. Pat. No. 6,880,654. Therein, a motorized vehicle is disclosed having a distributed motor system with a plurality of electric drive motors each coupled to a respective traction wheel. Each electric drive motor, steering motor, and wheel positioning motor may be integrated into a wheel manipulator element, and the wheel manipulator element may provide signals indicating the motion of the wheels to a controller of the vehicle.

Another example approach is shown by Thomas et al. in U.S. Pat. No. 7,384,357. Therein, a hybrid powertrain for a four-wheel drive vehicle is disclosed. The vehicle includes a front wheel drive system having front half shafts driveably connected to front wheels and driven by an electric motor drive unit. The powertrain also includes a rear wheel drive system having rear axle shafts driveably connected to rear wheels, the rear axle shafts driven by an internal combustion engine through a transmission, a drive shaft, and an inter-wheel differential mechanism.

However, the inventors herein have recognized potential issues with such systems. As one example, an electric motor configured to drive both front wheels of a vehicle, together, as described by the '357 patent may occupy a relatively larger amount of space. The electric motor in this configuration may not be suitable for vehicles having an internal combustion engine mounted in a longitudinal arrangement within the vehicle, such as a V-engine with cylinder banks positioned opposite to each other across a longitudinal axis of the vehicle. Such engine arrangements may not include an amount of space within the engine compartment to house the electric motor. As another example, a distributed motor system with different electric motors coupled to each wheel of a vehicle, such as that described by the '654 patent, may consume larger amounts of electrical energy in order to power the drivetrain of the vehicle. The larger amounts of electrical energy consumed may require electrical components (e.g., batteries, generators, etc.) with an increased size, complexity, and/or cost, and the electrical components may be difficult to maintain and/or repair.

In one example, the issues described above may be addressed by a system, comprising: a longitudinally mounted engine adapted to drive rear wheels of a vehicle; and two, independent, electric motors mounted to the engine, on opposite sides of the engine, and adapted to drive front wheels of the vehicle, where the two electric motors are not rotationally coupled to the engine. In this way, the engine may provide torque to the rear wheels of the engine, and the front wheels may be driven independently from the rear wheels by the two electric motors.

As one example, each of the two electric motors may be a pancake motor, with a diameter of each electric motor being greater than a width of each electric motor. The electric motors may be mounted directly to an oil pan of the engine and opposite to each other relative to a longitudinal axis of the engine. Each electric motor may be directly coupled to different reduction gearboxes in order to provide a torque output of each electric motor to front wheel axles of the vehicle. The engine may further include an integrated starter motor/generator configured to supply electrical power to the electric motors, with the starter motor/generator receiving torque from a crankshaft of the engine. By coupling the electric motors directly to the oil pan of the engine, an amount of space occupied by the electric motors within the vehicle may be reduced, and the electric motors may be selectively energized in order to drive the front wheels independently of the rear wheels. Additionally, by supplying electrical power to the electric motors via the integrated starter/generator, an electrical load on one or more batteries of the vehicle may be reduced during conditions such as engine idling.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-7 are shown to scale, though other relative dimensions may be used.

DETAILED DESCRIPTION

Figure 3:
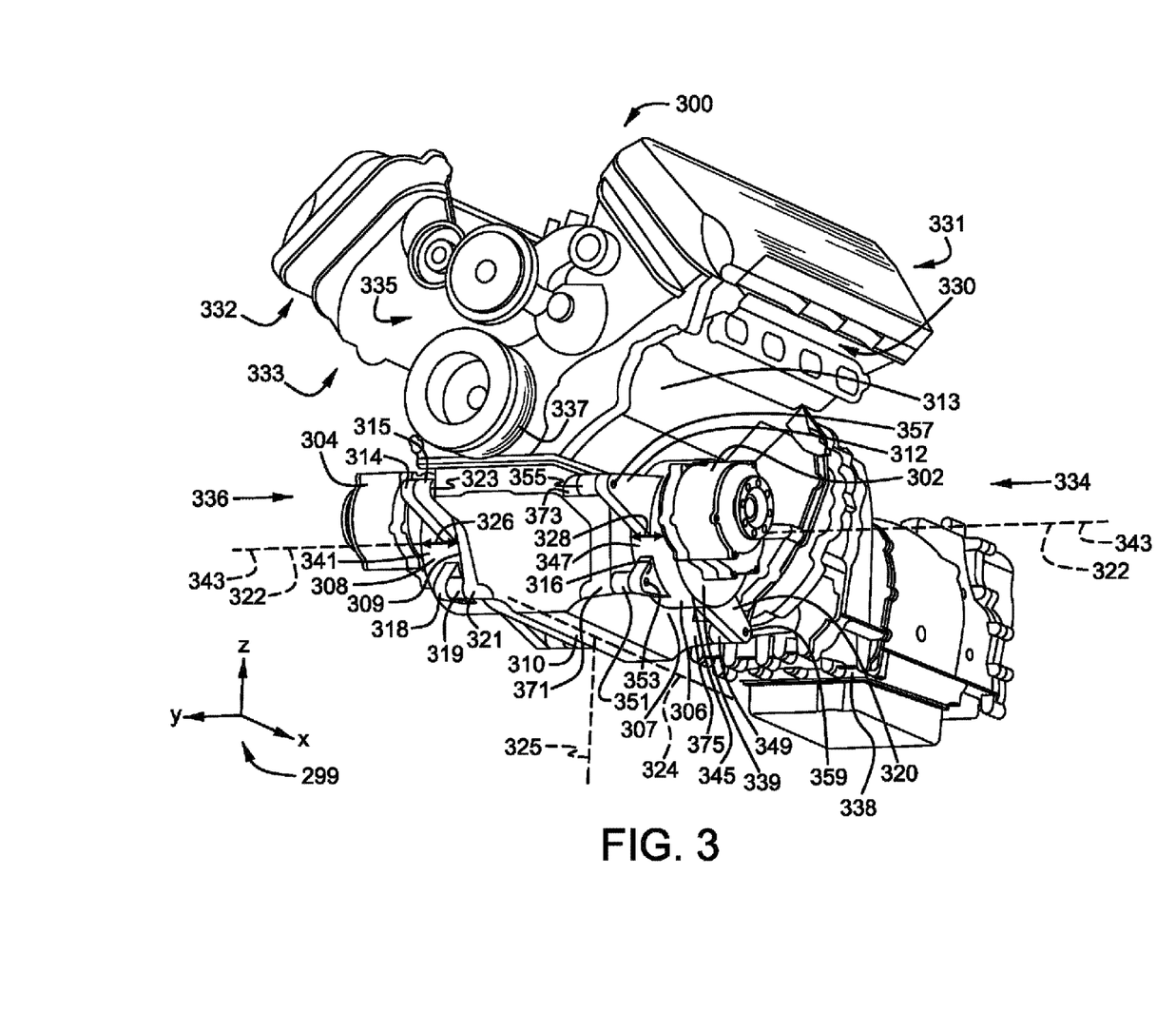
FIG. 3 shows a perspective view of an engine system including a first electric motor coupled to a first side of an engine and a second electric motor coupled to a second side of the engine.
Figure 4:
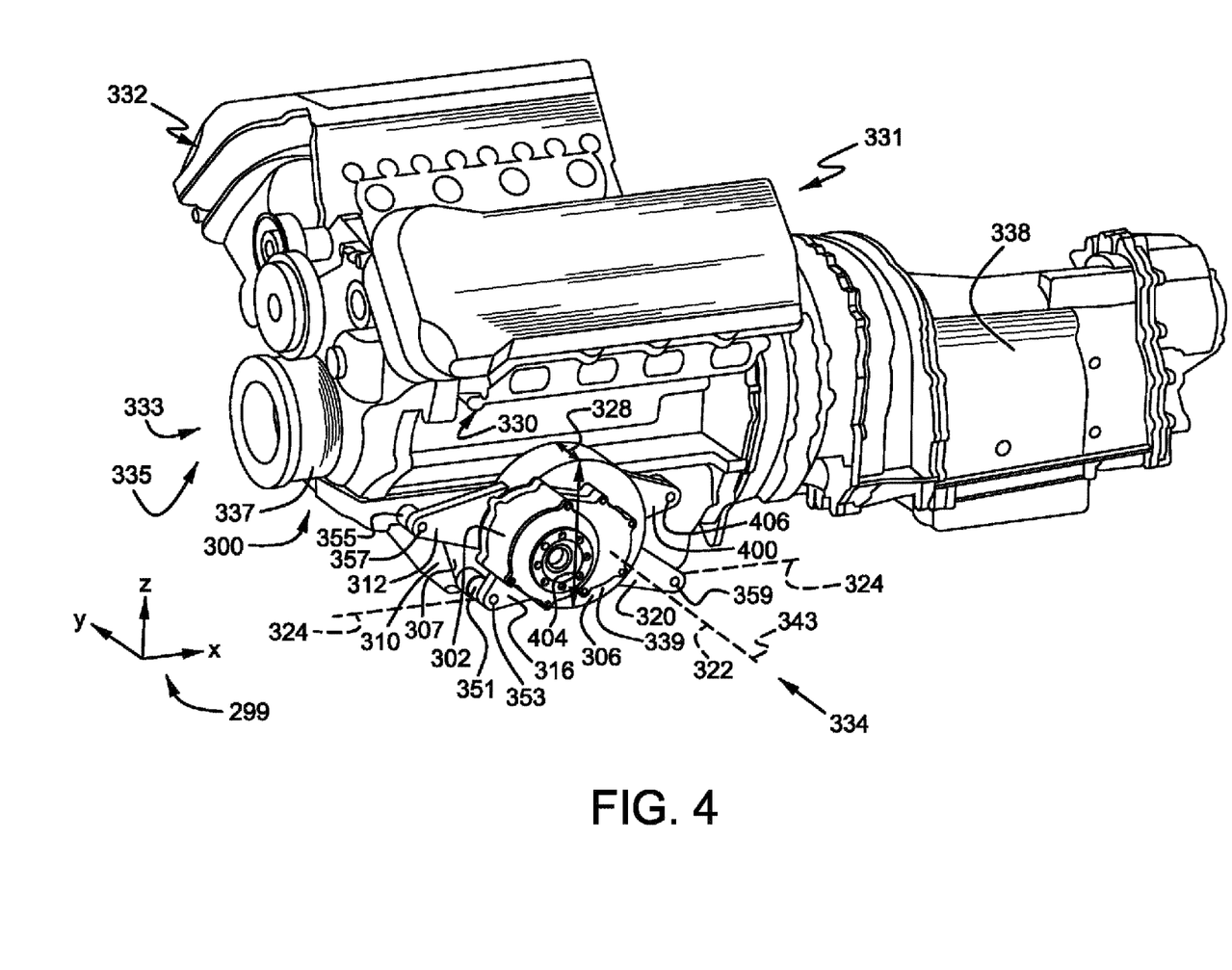
FIG. 4 shows a second perspective view of the engine system shown by FIG. 3.
Figure 5:
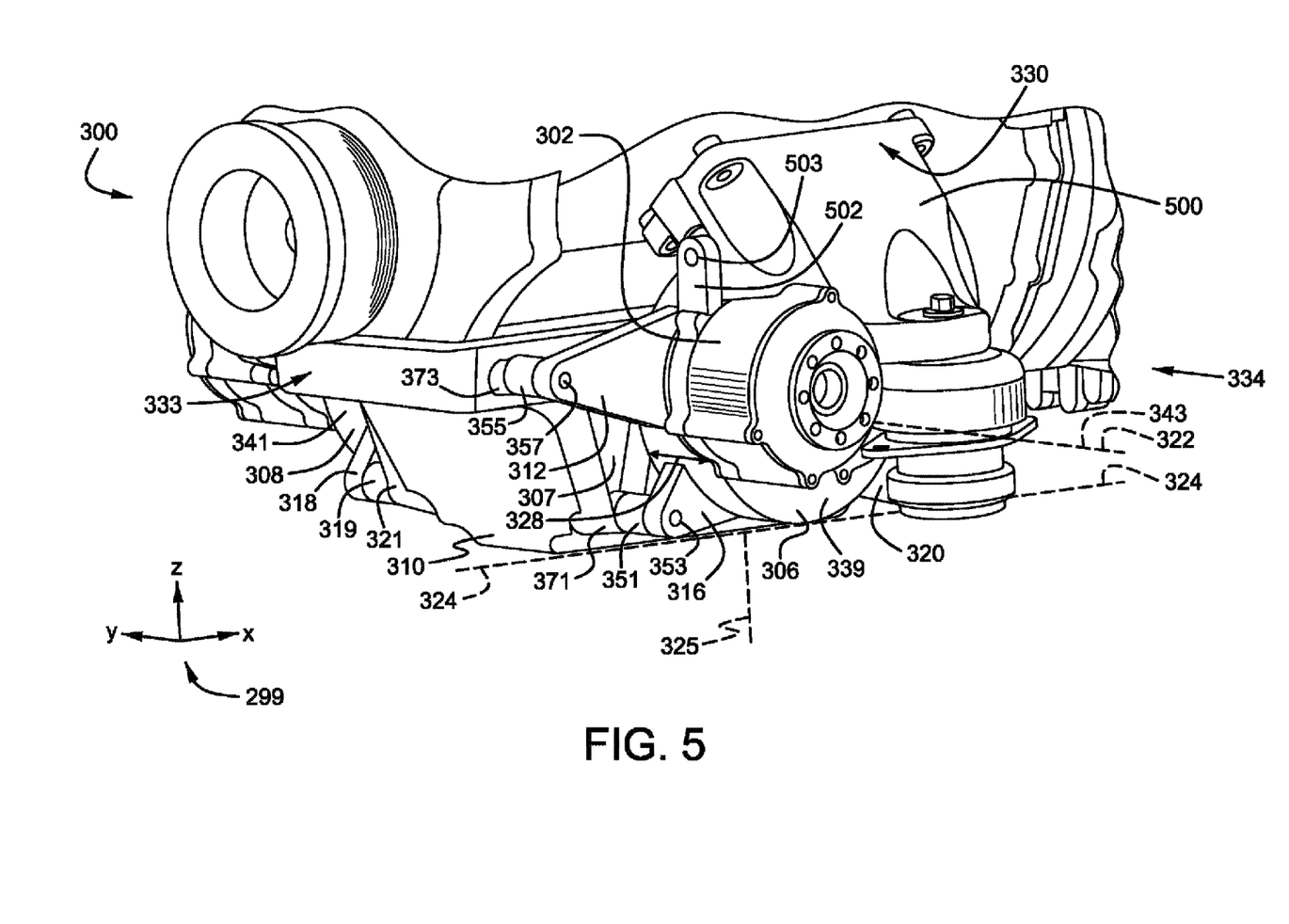
FIG. 5 shows a third perspective view of the engine system shown by FIGS. 3-4 and shows the first electric motor coupled to a first engine mount.
Figure 6:
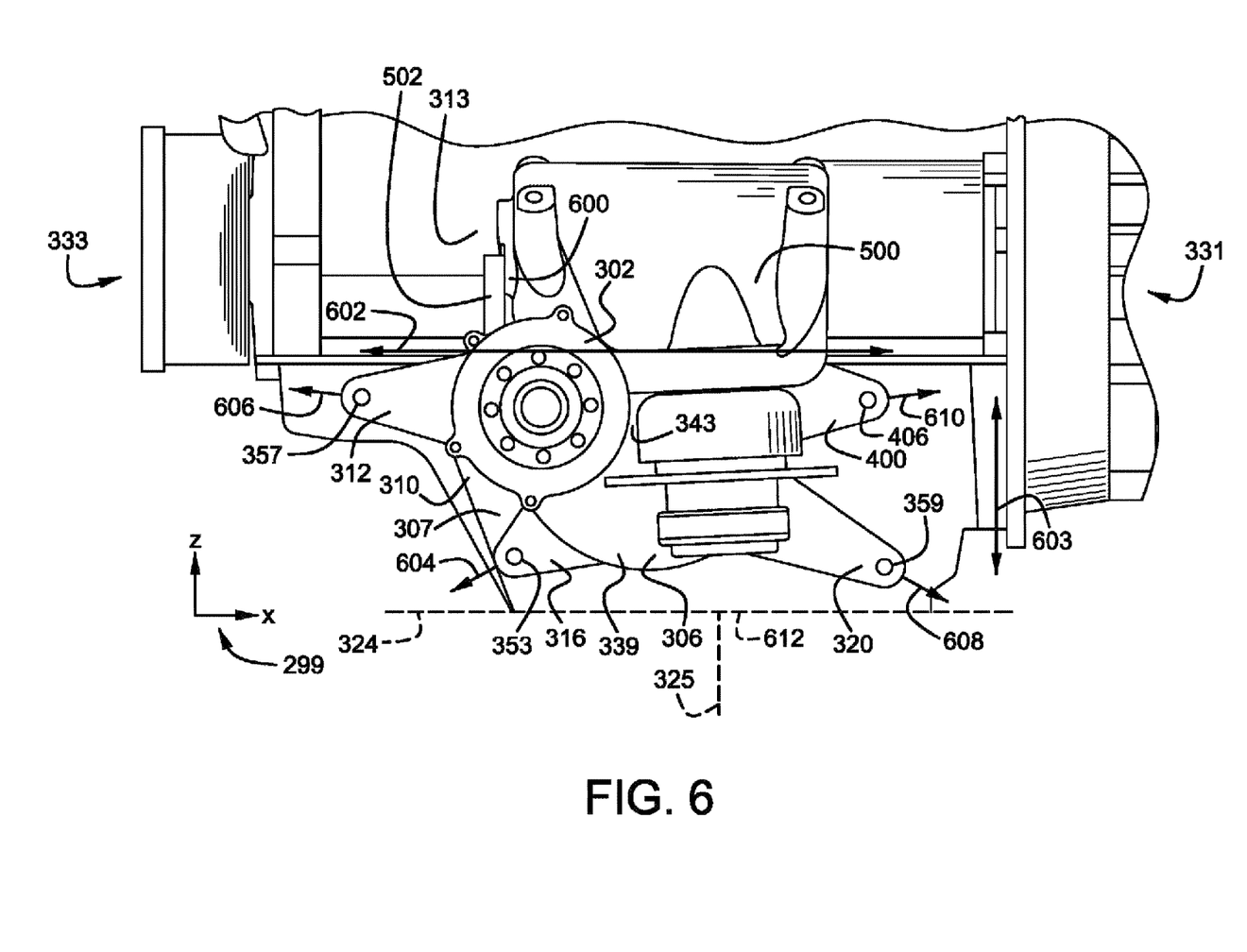
FIG. 6 shows a side view of the engine system shown by FIGS. 3-5 with the first electric motor coupled to the first engine mount.
Figure 7:
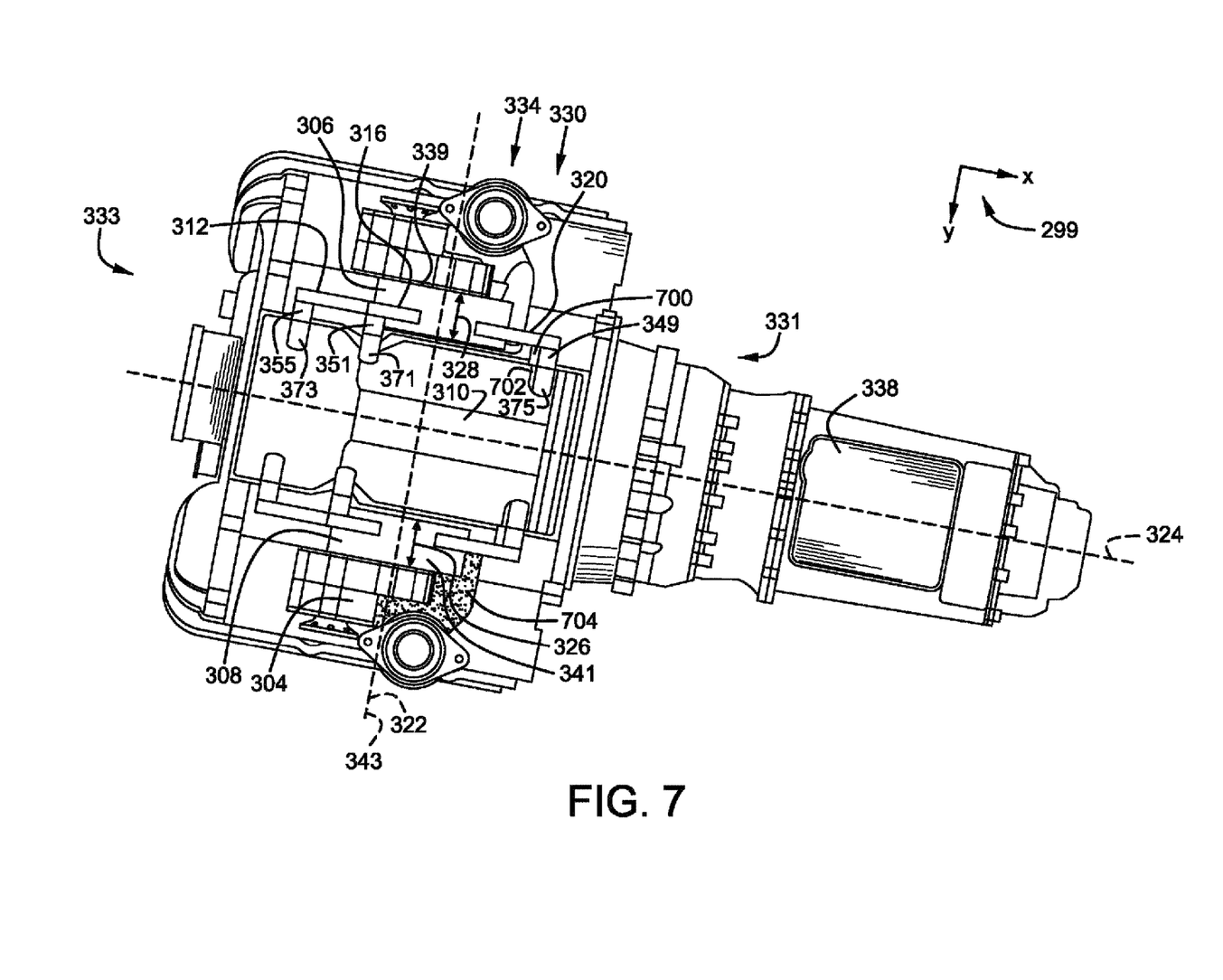
FIG. 7 shows a bottom view of the engine system shown by FIGS. 3-6.

The following description relates to systems and methods for an all-wheel drive system of a hybrid electric vehicle. A hybrid electric vehicle, such as the hybrid electric vehicle shown by FIGS. 1-2, includes a front-wheel drive system and a rear-wheel drive system. The rear-wheel drive system includes an internal combustion engine mounted along a longitudinal axis of the vehicle and positioned at a front end of the vehicle. The engine is configured to supply torque to rear wheels of the vehicle via a drive shaft. The front-wheel drive system includes a first electric motor directly coupled to a first side of the engine and a second electric motor directly coupled to a second side of the engine, as shown by FIG. 3. Each electric motor may be a pancake motor including a cylindrical section, with a diameter of the cylindrical section being less than a length of the cylindrical section, as shown by FIG. 4. The length of the cylindrical section is positioned parallel to a mounting axis of each electric motor, and the mounting axis of each electric motor is positioned perpendicular to the longitudinal axis of the vehicle, as shown by FIG. 7. Each electric motor includes a reduction gearbox coupled to a different front wheel axle of the vehicle, with the first electric motor driving a first front wheel axle via a first reduction gearbox, and with the second electric motor driving a second front wheel axle via a second reduction gearbox. A housing of each electric motor may be coupled to an oil pan of the engine by a plurality of arms, with each arm extending from the cylindrical section, as shown by FIG. 6. The first electric motor may be additionally coupled to a first engine mount at the first side of the engine (as shown by FIG. 5), and the second electric motor may be additionally coupled to a second engine mount at the second side of the engine. By coupling the first electric motor directly to the first side of the engine and the second electric motor directly to the second side of the engine, an amount of space occupied by the front-wheel drive system may be decreased, and the electric motors may be driven independently in order to rotate the front wheels of the vehicle independently relative to the rear wheels (and to each other).

Figure 1:
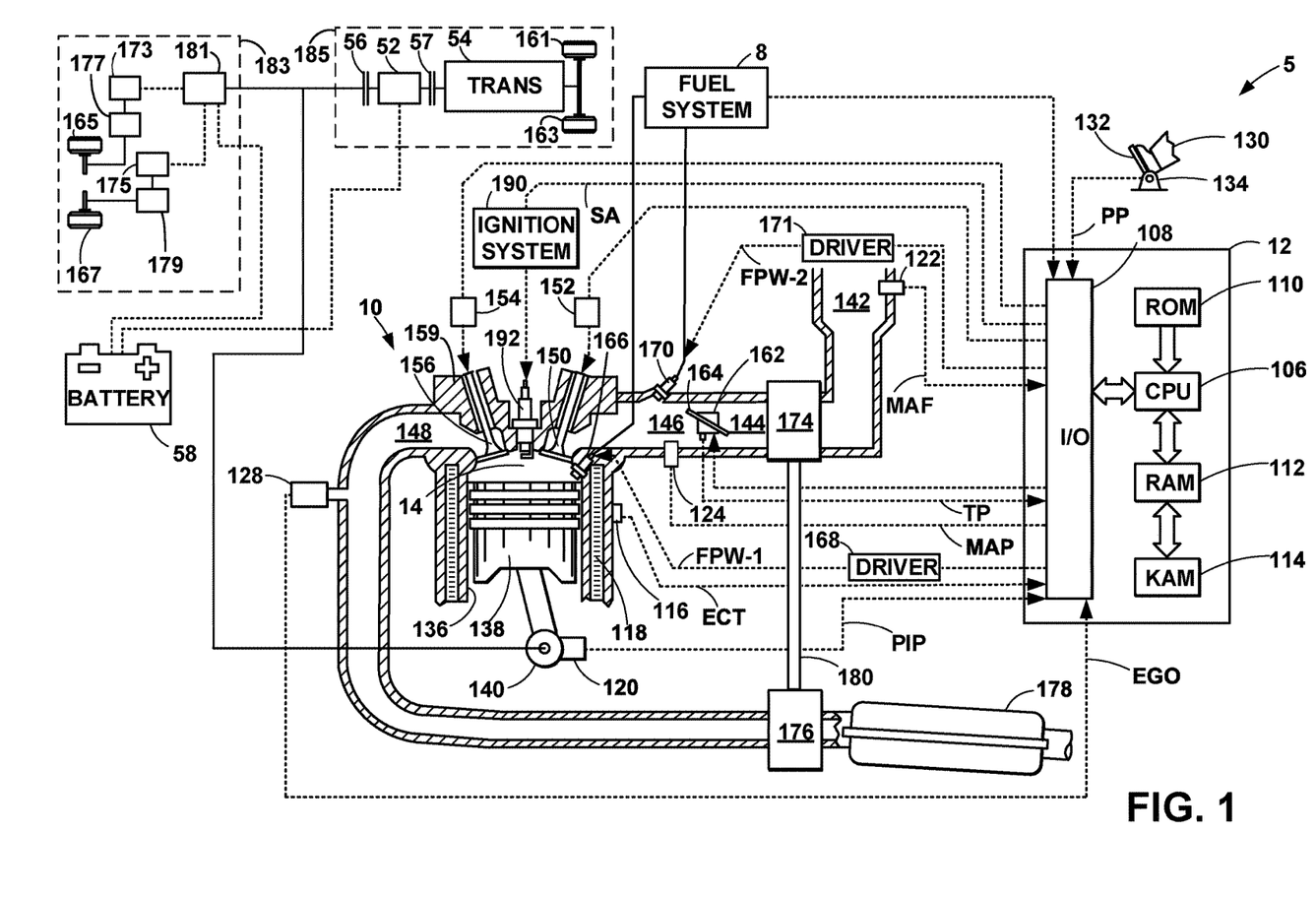
FIG. 1 shows a schematic diagram of an engine system including front wheels driven by electric motors.
Figure 2:
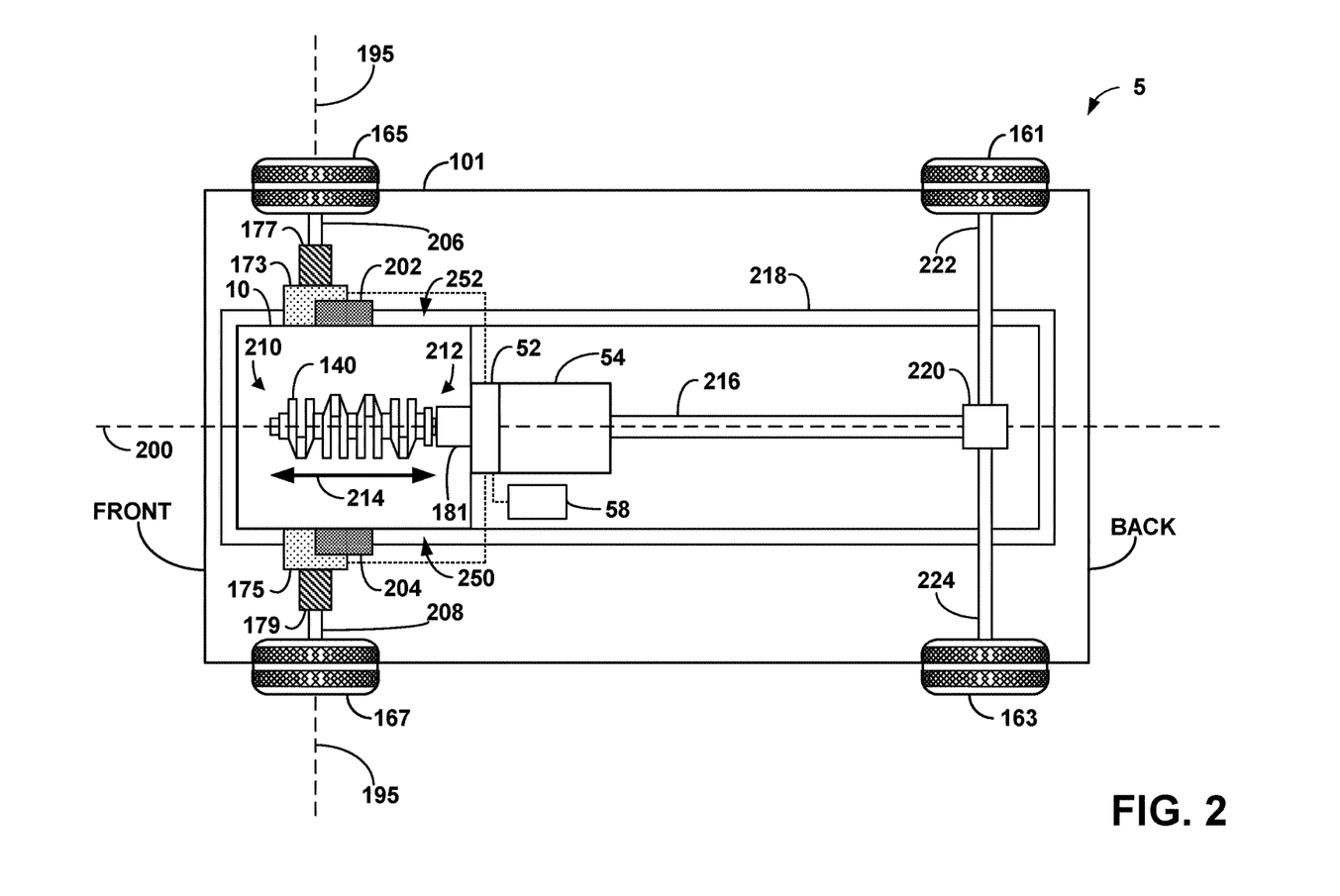
FIG. 2 shows a schematic diagram of a vehicle including the engine system of FIG. 1.

FIG. 1 and FIG. 2 each schematically show various components included by a hybrid electric vehicle 5. For example, FIG. 1 depicts an example of a cylinder 14 (which may be referred to herein as a combustion chamber) of internal combustion engine 10 included within vehicle 5, and FIG. 2 schematically depicts the vehicle 5 from a top view in order to further illustrate components of the vehicle 5 (e.g., components of a front-wheel drive system 183 and a rear-wheel drive system 185 described below with reference to FIG. 1). Some components shown by FIG. 1 may not be shown by FIG. 2 (or vice versa) for illustrative purposes.

Turning firstly to FIG. 1, cylinder 14 of engine 10 is shown to include cylinder walls 136 capped by cylinder head 159. The cylinder 14 includes a piston 138 positioned therein. Piston 138 is coupled to crankshaft 140 so that reciprocating motion of the piston is translated into rotational motion of the crankshaft. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 is configured to provide torque to the rear-wheel drive system 185 of the vehicle 5 via crankshaft 140. Specifically, crankshaft 140 is coupled to transmission 54 and provides input torque to transmission 54, with the transmission 54 being a gearbox, a planetary gear system, or another type of transmission. The transmission 54 converts the input torque into an output torque via a plurality of gears internal to the transmission 54, and the output torque is provided to the rear wheels of the vehicle by the transmission 54 in order to drive the rear wheels.

In some examples, the rear-wheel drive system 185 of the vehicle 5 may additionally include electric machine 52 configured to provide torque to first rear wheel 163 and second rear wheel 161 via transmission 54. For example, electric machine 52 may be connected (e.g., coupled) to transmission 54 in order to drive transmission 54 and provide torque to first rear wheel 163 and second rear wheel 161 during conditions in which one or more clutches are engaged. In the depicted example, a first clutch 56 is provided between crankshaft 140 and electric machine 52, and a second clutch 57 is provided between electric machine 52 and transmission 54. Controller 12 may send a signal to an actuator of each clutch (e.g., first clutch 56 and/or second clutch 57) to engage or disengage the clutches, so as to connect or disconnect crankshaft 140 from electric machine 52 and the components connected thereto, and/or connect or disconnect electric machine 52 from transmission 54 and the components connected thereto. Electric machine 52 receives electrical power from a traction battery 58 to provide torque to first rear wheel 163 and the second rear wheel 161. Electric machine 52 may also be operated as a generator to provide electrical power to charge battery 58, for example during a braking operation.

The rear-wheel drive system 185 may be configured to operate in various manners including a parallel configuration (e.g., with torque provided to the rear wheels by both engine 10 and electric machine 52), a series configuration (e.g., with torque provided to the rear wheels by one of the engine 10 or the electric machine 52, and with the other of engine 10 or electric machine 52 providing electrical energy to the vehicle 5), or a series-parallel configuration. In other examples, the vehicle 5 may not include the electric machine 52, with the rear wheels being driven by the crankshaft 140 of engine 10 as described above.

The front wheels of the vehicle 5 (e.g., first front wheel 167 and second front wheel 165) are not driven by engine 10. Instead, each front wheel is driven by a respective electric motor, with the driving of the front wheels being independent relative to the driving of the rear wheels (e.g., by rear-wheel drive system 185 as described above). Specifically, the front-wheel drive system 183 includes a first electric motor 175 coupled to the first front wheel 167 via a first reduction gearbox 179, and the front-wheel drive system 183 additionally includes a second electric motor 173 coupled to the second front wheel 165 via a second reduction gearbox 177. By driving the front wheels independently relative to the rear wheels, a traction of the front wheels (e.g., a frictional force between front wheels of the vehicle 5 and a ground surface on which the vehicle 5 sits) may be increased in order to more easily drive the vehicle 5. For example, during conditions in which the rear wheels are unable to provide sufficient traction to drive the vehicle 5 (e.g., conditions in which the rear wheels are positioned on surfaces of loosely packed particles, such as sand, or surfaces having a lower coefficient of friction, such as ice and/or snow), one or both of the front wheels may be driven independently of the rear wheels in order to move the vehicle 5. In some examples, both of first electric motor 175 and second electric motor 173 may be energized in order to drive both of the front wheels (e.g., first front wheel 167 and second front wheel 165, respectively). In other examples, only one of the electric motors may be energized to drive only a single front wheel independent of the other front wheel (e.g., first electric motor 175 may be energized in order to drive first front wheel 167 independently relative to second front wheel 165, or second electric motor 173 may be energized to drive second front wheel 165 independently relative to first front wheel 167). In some examples, a selected drive mode of the vehicle 5 (e.g., all-wheel drive, rear-wheel drive, dual front-wheel drive, single front-wheel drive, etc.) may be selected by the operator 130 of the vehicle 5 via one or more user interface devices (e.g., touchscreens, buttons, etc.) positioned within a cabin of the vehicle 5 and in electrical communication with controller 12. In other examples, the drive mode of the vehicle 5 may be selected by the controller 12 responsive to detected and/or estimated operating conditions of the vehicle 5 (e.g., vehicle speed, engine speed, etc.). In yet other examples, the drive mode of the vehicle 5 may be selected by the controller 12 responsive to detected and/or estimated environmental conditions (e.g., detection of rain, snow, etc. by sensors of the vehicle 5).

The crankshaft 140 may be coupled to an integrated starter/generator 181 to enable a starting operation of engine 10 and to provide electrical energy to battery 58. For example, during conditions in which the engine 10 is in a non-operating mode (e.g., a mode in which the engine 10 is off and is not combusting fuel/air within engine cylinders, such as cylinder 14), an operator of the vehicle 5 (e.g., a user, driver, etc.) may adjust the engine 10 from the non-operating mode to an operating mode (e.g., a mode in which the engine is on and is combusting fuel/air within engine cylinders, such as cylinder 14) via user input to one or more user input devices of the vehicle (e.g., user interaction with input devices of ignition system 190, such as pressing an ignition button within a cabin of the vehicle). The controller 12 may transmit an electrical signal to the starter/generator 181 in response to the user input in order to actuate the starter/generator 181 to rotate the crankshaft of the engine 10 to perform the starting operation (e.g., adjusting the engine from the non-operating mode to the operating mode). The controller 12 may also transmit electrical signals to spark plug 192 in order to produce spark within cylinder 14, and/or the controller 12 may transmit electrical signals to adjust an amount of opening of a nozzle of fuel injector 166 and/or fuel injector 170 in order to provide fuel to cylinder 14.

During conditions in which the engine is in the operating mode (e.g., the engine 10 is on and combusting fuel/air), the integrated starter/generator 181 may receive a portion of the torque produced by the crankshaft 140 in order to generate electrical energy to be stored by battery 58 and/or utilized to energize the electric motors (e.g., first electric motor 175 and/or second electric motor 173) to drive the front wheels of the vehicle. For example, during conditions in which the engine 10 is operating at a lower engine speed (e.g., idling, coasting, etc.), the starter/generator 181 may generator electrical energy to be stored by battery 58. During conditions in which the engine 10 is operating at a higher engine speed (e.g., during acceleration of the vehicle 5), the starter/generator 181 may generate electric energy from the rotational motion of the crankshaft 140 and may route (e.g., provide, deliver, etc.) the electrical energy to the first electric motor 175 and/or second electric motor 173 in order to drive the first front wheel 167 and/or second front wheel 165. In some examples, the first electric motor 175 and second electric motor 173 may be energized (e.g., by starter/generator 181 and/or battery 58) in order to drive the front wheels during conditions in which the engine 10 is in the non-operating mode and/or during conditions in which the engine 10 is operating at a lower engine speed (e.g., idling).

Cylinder 14 can receive intake air via a series of intake air passages 142, 144, and 146. Intake air passage 146 can communicate with other cylinders of engine 10 in addition to cylinder 14. In some examples, one or more of the intake passages may be coupled to a boosting device such as a turbocharger or a supercharger. For example, FIG. 1 shows engine 10 configured with a turbocharger including a compressor 174 arranged between intake air passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine 10. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 includes one or more intake valves and one or more exhaust valves. For example, cylinder 14 is shown including at least one intake poppet valve 150 and at least one exhaust poppet valve 156 located at an upper region of cylinder 14 (e.g., disposed within cylinder head 159). In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and/or fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle (e.g., combustion cycle) of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

The controller 12 receives signals from the various sensors of FIG. 1 and employs the various actuators of FIG. 1 to adjust engine operation based on the received signals and instructions stored on a memory of the controller. For example, adjusting an output of the first electric motor 175 may include adjusting an amplitude and/or frequency of an electrical signal transmitted to the first electric motor 175 by the controller 12. In one example, the controller 12 may adjust the output of the first electric motor 175 by adjusting a voltage supplied to the first electric motor 175 via the battery 58 and/or the starter/generator 181. In another example, the controller 12 may adjust a rotational speed of the first front wheel 167 by transmitting electrical signals to the first reduction gearbox 179 in order to adjust a selected gear ratio of the first reduction gearbox 179.

As described above, FIG. 1 shows only one cylinder of a multi-cylinder engine. As such, each cylinder may similarly include its own set of intake/exhaust valves, hydraulic lash adjusters, rocker arms, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

FIG. 2 shows a body 101 of vehicle 5 with a front end, labeled "FRONT", and a back end labeled "BACK." Vehicle 5 includes the first front wheel 167 and the second front wheel 165 positioned at the front end of the vehicle, and also includes the first rear wheel 163 and the second rear wheel 161 positioned at the back end of the vehicle. As described above with reference to FIG. 1, vehicle 5 includes internal combustion engine 10 configured to drive the first rear wheel 163 and the second rear wheel 161 via transmission 54.

The engine 10 is mounted longitudinally within the vehicle 5 such that the crankshaft 140 of the engine is positioned parallel to a longitudinal axis 200 of the vehicle 5 (e.g., an axis extending from the front end to the back end of the vehicle). The engine 10 may be mounted (e.g., coupled) to a frame 218 of the vehicle 5 via one or more engine mounts. For example, FIG. 2 shows a first engine mount 204 and second engine mount 202 coupling the engine 10 to the frame 218 at opposite sides of the engine 10 (e.g., opposite relative to the longitudinal axis 200). In this configuration, a length 214 of the crankshaft 140 is positioned parallel to the longitudinal axis 200. A first end 210 of the crankshaft 140 may provide torque to one or more auxiliary components of the vehicle (e.g., fans, a cabin air condition system, fluid pumps, etc.). A second end 212 is coupled to the transmission 54 and provides torque for driving the first rear wheel 163 and the second rear wheel 161 (e.g., via drive shaft 216 coupled to first rear axle 224 and second rear axle 222 via differential 220).

The first electric motor 175 is mounted (e.g., coupled) to a first side 250 of the engine 10 and the second electric motor 173 is mounted to a second side 252 of the engine 10. In some examples (as described below with reference to FIGS. 3-7), the first electric motor 175 and second electric motor 173 may each be directly coupled to an oil pan of the engine 10. The oil pan may be coupled to an engine block of the engine 10 to seal an opening at a bottom of a crankcase of the engine 10, with the crankcase housing the crankshaft 140. The first electric motor 175 and second electric motor 173 are not rotationally coupled to the engine 10. For example, rotating the crankshaft 140 of the engine 10 does not rotate the first electric motor 175 or the second electric motor 173 relative to the engine 10.

The first electric motor 175 is shown coupled to first reduction gearbox 179, and the second electric motor 173 is shown coupled to the second reduction gearbox 177. The first reduction gearbox 179 is positioned between an output end of the first electric motor 175 and a first front axle 208, and the second reduction gearbox 177 is positioned between an output end of the second electric motor 173 and a second front axle 206. The first front axle 208 is coupled to first front wheel 167 and the second front axle 206 is coupled to the second front wheel 165. Rotating the first front axle 208 may drive (e.g., rotate) the first front wheel 167, and rotating the second front axle 206 may drive the second front wheel 165. In one example, the first front axle 208 is driven by an output of the first reduction gearbox 179, and the output of the first reduction gearbox 179 is driven by an input of the first reduction gearbox 179 coupled to an output of the first electric motor 175. The first reduction gearbox 179 may include a plurality of gears configured to adjust a gear ratio of the input of the first reduction gearbox 179 to the output of the first reduction gearbox 179. The controller 12 (shown by FIG. 1) may transmit electrical signals to the first reduction gearbox 179 in order to adjust the gear ratio in response to vehicle operating conditions (e.g., in response to a detected engine load, vehicle speed, etc.). Although the coupling of the first electric motor 175 to first reduction gearbox 179 and first front axle 208 are described herein as an example, the second electric motor 173, second reduction gearbox 177, and second front axle 206 are coupled (and operate) in a similar way.

The first front axle 208 and second front axle 206 are each positioned along a latitudinal axis 195 of the vehicle 5. The latitudinal axis 195 is positioned perpendicular to the longitudinal axis 200 and is a rotational axis of the first front axle 208 and the second front axle 206. Said another way, the first electric motor 175 drives the first front axle 208 to rotate about latitudinal axis 195, and the second electric motor 173 drives the second front axle 206 to rotate about latitudinal axis 195. In some examples, an output end of the first electric motor 175 and/or an output end of the second electric motor 173 may additionally be positioned along the latitudinal axis 195.

As described above with reference to FIG. 1, the vehicle 5 may include integrated starter/generator 181 coupled to crankshaft 140. The starter/generator 181 may provide operating voltages to the first electric motor 175 and second electric motor 173 during operation of the engine 10.

During some engine operating conditions (e.g., engine idling, coasting, etc.), engine 10 may be operated to drive starter/generator 181 which may in turn provide a generator function to convert the engine output to electrical energy, where the electrical energy may be stored in battery 58 for later use by the motor. Embodiments of battery 58 may include one or more rechargeable batteries, fuel cells, and/or capacitors for example. In these examples, electrical energy may be temporarily converted to chemical or potential energy for storage.

In some embodiments, battery 58 may be configured to store electrical energy that may be supplied to other electrical loads residing on-board the vehicle (other than the first electric motor 175 and second electric motor 173), including cabin heating and air conditioning, engine starting, headlights, cabin audio and video systems, etc.

Controller 12 may communicate with one or more of engine 10, starter/generator 181, first electric motor 175, second electric motor 173, first reduction gearbox 179, second reduction gearbox 177, and battery 58. Controller 12 may receive sensory feedback information from one or more of engine 10, starter/generator 181, first electric motor 175, second electric motor 173, first reduction gearbox 179, second reduction gearbox 177, and battery 58. Further, controller 12 may send control signals to one or more of engine 10, starter/generator 181, first electric motor 175, second electric motor 173, first reduction gearbox 179, second reduction gearbox 177, and battery 58 responsive to this sensory feedback. Controller 12 may receive an indication of an operator requested output of the vehicle propulsion system from vehicle operator 130 (shown by FIG. 1). For example, controller 12 may receive sensory feedback from pedal position sensor 134 which communicates with pedal 132. Pedal 132 may refer schematically to a brake pedal and/or an accelerator pedal.

In some embodiments, battery 58 may periodically receive electrical energy from a power source residing external to the vehicle (e.g. not part of the vehicle). As a non-limiting example, the propulsion system of vehicle 5 may be configured as a plug-in hybrid electric vehicle (HEV), whereby electrical energy may be supplied to battery 58 from the external power source via an electrical energy transmission cable. During a recharging operation of battery 58 from the external power source, the electrical transmission cable may electrically couple the battery 58 and the external power source. While the vehicle propulsion system is operated to propel the vehicle, the electrical transmission cable may disconnected between the external power source and the battery 58. Controller 12 may identify and/or control the amount of electrical energy stored at the energy storage device, which may be referred to as the state of charge (SOC).

In other embodiments, the electrical transmission cable may be omitted, where electrical energy may be received wirelessly at battery 58 from the external power source. For example, battery 58 may receive electrical energy from the external power source via one or more of electromagnetic induction, radio waves, and electromagnetic resonance. As such, it should be appreciated that any suitable approach may be used for recharging battery 58 from a power source that does not comprise part of the vehicle.

FIGS. 3-7 show an engine 300 similar to the engine 10 described above with reference to FIGS. 1-2. The engine 300 is mounted longitudinally within a vehicle (not shown) similar to the vehicle 5 described above. A first electric motor 306 is directly coupled to a first side 334 of the engine 300, and a second electric motor 308 is directly coupled to a second side 336 of the engine 300 (similar to first electric motor 175 and second electric motor 173, respectively, described above with reference to FIGS. 1-2). FIGS. 3-7 each show different perspective views of the engine 300 in order to illustrate the arrangement of the first electric motor 306 and the second electric motor 308 relative to other components of the vehicle. Reference axes 299 are included by each of FIGS. 3-7 for comparison of the views shown.

In the example shown by FIGS. 3-7, engine 300 is a V-engine with a first plurality of cylinders (e.g., cylinders similar to cylinder 14 described above with reference to FIG. 1) positioned in a first cylinder bank 330 and a second plurality of cylinders positioned in a second cylinder bank 332. In alternate embodiments, the engine 300 may be different type of engine (e.g., an inline engine including a single cylinder bank with each cylinder positioned along a same axis) with a different number of cylinders, different relative arrangement of cylinders and/or cylinder banks, etc.

The first side 334 of the engine 300 is positioned opposite to the second side 336 relative to a longitudinal axis 324 of the engine 300. The longitudinal axis 324 of the engine 300 is aligned with (e.g., positioned parallel to and in a same space as) a longitudinal axis of the vehicle (e.g., longitudinal axis 200 of vehicle 5 described above with reference to FIGS. 1-2). In the example shown by FIGS. 3-7, the first cylinder bank 330 is positioned at the first side 334 and the second cylinder bank 332 is positioned at the second side 336.

The engine 300 includes an oil pan 310, with the oil pan 310 positioned along the longitudinal axis 324 and coupled to an engine block 313 of the engine 300. Specifically, oil pan 310 is coupled to the engine block 313 at a position vertically below the first cylinder bank 330 and the second cylinder bank 332 relative to a ground surface on which the vehicle sits. The oil pan 310 is centered between the first cylinder bank 330 and the second cylinder bank 332 and is positioned along a central vertical axis 325 of the engine 300. A first exterior surface 307 of the oil pan 310 is positioned at the first side 334, and a second exterior surface 309 of the oil pan 310 is positioned at the second side 336.

The vehicle includes a transmission 338 coupled to the engine 300 along the longitudinal axis 324. The transmission 338 is coupled to the engine block 313 at a rear end 331 of the engine 300. The rear end 331 is positioned opposite to a front end 333 in a direction of the longitudinal axis 324. The transmission 338 is provided torque by a crankshaft (similar to crankshaft 140 shown by FIGS. 1-2 and described above) of the engine in order to drive rear wheels of the vehicle (similar to first rear wheel 163 and second rear wheel 161 described above). The front end 333 of the engine 300 may include a front end accessory drive 335 (FEAD) having a plurality of pulleys (e.g., pulley 337). One or more of the pulleys of the FEAD may be driven by the crankshaft in order to drive auxiliary components of the vehicle (e.g., fans, a cabin air condition system, fluid pumps, etc.).

The first electric motor 306 is directly coupled to the first exterior surface 307 of the oil pan 310 at the first side 334, and the second electric motor 308 is directly coupled to the second exterior surface 309 of the oil pan 310 at the second side 336. A mounting axis 322 of each electric motor is positioned perpendicular to the longitudinal axis 324 of the engine 300 (as shown by FIG. 7) and parallel to a rotational axis of the front wheels of the vehicle (e.g., latitudinal axis 195 through first front wheel 167 and second front wheel 165 as described above with reference to FIGS. 1-2). Each electric motor may include a cylindrical section (e.g., cylindrical section 339 of the first electric motor 306 and cylindrical section 341 of the second electric motor 308), and each electric motor may be coupled to the oil pan 310 in a position in which a central axis of each cylindrical section is parallel to the mounting axis 322 and positioned along the mounting axis 322.

In the example shown by FIGS. 3-7, first electric motor 306 and second electric motor 308 each include a plurality of arms and axial extensions shaped to couple the electric motors to the respective surfaces of the oil pan 310 (e.g., to couple first electric motor 306 to first exterior surface 307, and to couple second electric motor 308 to second exterior surface 309). For example, a housing 345 of the first electric motor 306 includes a first arm 316, a second arm 312, a third arm 320, and a fourth arm 400 (shown by FIG. 4 and FIG. 6) each extending in an outward direction (e.g., away from the central axis 343 of the cylindrical section 339 and away from the mounting axis 322) relative to a side surface 347 of the first electric motor 306. The side surface 347 is positioned to surround the mounting axis 322 and the central axis 343 of the cylindrical section 339, and the side surface 347 has a width 328 in a direction parallel to the central axis 343 of the cylindrical section 339. In one example, each arm may be positioned radially relative to the central axis 343 of the cylindrical section 339. In other examples (such as the example shown by FIGS. 3-7), one or more of the arms may be angled by a different amount relative to the central axis 343 than each other arm.

As shown by FIG. 6, each arm of the first electric motor 306 (e.g., first arm 316, a second arm 312, a third arm 320, and fourth arm 400) extends in a different direction relative to each other arm. For example, the first arm 316 extends in a first direction 604 away from the central axis 343, toward the front end 333 of the engine 300, and vertically toward a bottom surface 612 of the oil pan 310 (e.g., vertically relative to the ground surface on which the vehicle sits, in a direction of the z-axis shown by reference axes 299). Second arm 312 extends in a second direction 606 away from the central axis 343, toward the front end 333, and away from the bottom surface 612 of the oil pan 310, toward the engine block 313. Third arm 320 extends in a third direction 608 away from the central axis 343, toward the rear end 331 of the engine 300, and vertically toward the bottom surface 612 of the oil pan 310. Fourth arm 400 extends in a fourth direction 610 away from the central axis 343, toward the rear end 331 of the engine 300, and vertically away from the bottom surface 612, toward the engine block 313.

By positioning the arms in this way, the first electric motor 306 is coupled to the oil pan 310 across an increased length 602 and an increased height 603 of the oil pan 310 (with the length 602 in the direction of the longitudinal axis 324, and with the height 603 in the vertical direction indicated by the z-axis of reference axes 299). This configuration increases a sturdiness and stability of the coupling of the first electric motor 306 to the oil pan 310. For example, during conditions in which the first electric motor 306 is energized (e.g., via a battery such as battery 58 and/or a starter/generator such as integrated starter/generator 181 described above with reference to FIGS. 1-2) in order to provide torque to a front wheel of the vehicle (e.g., first front wheel 167 described above), the coupling of the first electric motor 306 to the oil pan 310 across the increased length 602 and increased height 603 of the first exterior surface 307 of the oil pan 310 via the arms retains the first electric motor 306 in its position relative to the oil pan 310 and prevents the housing 345 of the first electric motor 306 from rotating relative to the oil pan 310 and engine 300.

The first arm 316, second arm 312, third arm 320, and fourth arm 400 each include an axial extension positioned to align with a respective mounting boss of the oil pan 310 (as described further below). For example, the first arm 316 includes a first axial extension 351, the second arm 312 includes a second axial extension 355, the third arm 320 includes a third axial extension 349, and the fourth arm 400 includes a fourth axial extension 700 (shown by FIG. 7). Each axial extension extends away from its respective arm in an axial direction of the first electric motor 306 (e.g., a direction parallel to the central axis 343 of the cylindrical section 339, and toward the oil pan 310). Each axial extension includes a central opening (e.g., a passage) positioned to align with an opening of a mounting boss of the oil pan 310. For example, first axial extension 351 includes first opening 353 positioned to align with an opening of a first mounting boss 371, second axial extension 355 includes second opening 357 positioned to align with an opening of a second mounting boss 373, third axial extension 349 includes third opening 359 positioned to align with an opening of a third mounting boss 375, and fourth axial extension 700 includes fourth opening 406 (shown by FIG. 4) positioned to align with an opening of a fourth mounting boss 702 (shown by FIG. 7). In some examples, a fastener (e.g., a bolt) may be inserted through the opening of each axial extension and into the corresponding opening of the respective mounting bosses in order to couple the housing 345 of the first electric motor 306 to the first exterior surface 307 of the oil pan 310. In other examples, the axial extensions may be coupled to the mounting bosses in a different way (e.g., clamped, welded, etc.). In yet other examples, the housing 345 of the first electric motor 306 may include a different number and/or arrangement of axial extensions and/or arms, and in other examples, the housing 345 may not include the axial extensions and/or the arms. For example, the housing 345 may include one or more openings formed by the cylindrical section 339 and positioned to align with respective mounting bosses of the oil pan 310 in order to couple the housing 345 to the first exterior surface 307 (e.g., via fasteners inserted through the openings and into the mounting bosses).

Although the first electric motor 306 coupled to the first exterior surface 307 is described above as an example, the second electric motor 308 may be coupled to the second exterior surface 309 of the oil pan 310 in a similar way (e.g., via a plurality of arms having axial extensions coupled to mounting bosses of the oil pan 310, such as axial extension 319 of arm 318 coupled to mounting boss 321 as shown by FIG. 3 and FIG. 5, and axial extension 315 of arm 314 coupled to mounting boss 323 as shown by FIG. 3).

First electric motor 306 is directly coupled to a first reduction gearbox 302, and second electric motor 308 is directly coupled to a second reduction gearbox 304. Said another way, first electric motor 306 is coupled to first reduction gearbox 302 without any additional components positioned between the first electric motor 306 and the first reduction gearbox 302, and the second electric motor 308 is coupled to the second reduction gearbox 304 without any additional components positioned between the second electric motor 308 and the second reduction gearbox 304. In one example, the housing 345 of first electric motor 306 may be directly coupled with the first reduction gearbox 302 such that the housing 345 may share one or more common surfaces with the first reduction gearbox 302 and/or surfaces of the housing 345 may be in face-sharing contact with surfaces of the first reduction gearbox 302. The second electric motor 308 may be coupled to the second reduction gearbox 304 in a similar way.

A torque produced by the first electric motor 306 (e.g., via energization of the first electric motor 306 by a controller of the engine 300, similar to controller 12 described above with reference to FIGS. 1-2) is converted into a rotational motion of a first front axle of the vehicle (e.g., first front axle 208 described above with reference to FIG. 2) by the first reduction gearbox 302. In one example, torque applied to an input shaft of the first reduction gearbox 302 by the first electric motor 306 may result in a rotation of the input shaft at a first speed. Rotating the input shaft at the first speed may rotate a plurality of gears within the first reduction gearbox 302, and the rotation of the gears may apply a torque to the first axle to rotate the first axle at a second speed.

In some examples, a gear ratio of the first reduction gearbox 302 may be adjusted via electrical signals transmitted to the first reduction gearbox 302 by the controller. Adjusting the gear ratio may adjust the rotational speed of the first axle (e.g., rotating at the second speed) relative to the rotational speed of the input shaft (e.g., rotating at the first speed). In one example, increasing the gear ratio may reduce the rotational speed of the first axle relative to the rotational speed of the input shaft, and decreasing the gear ratio may increase the rotational speed of the first axle relative to the rotational speed of the input shaft.

Although operation of the first electric motor 306 and first reduction gearbox 302 are described above as an example, the second electric motor 308 and second reduction gearbox 304 may operate in a similar way (e.g., with a torque produced by the second electric motor 308 against an input shaft of the second reduction gearbox 304 being converted into a rotational motion of a second front axle coupled to the second reduction gearbox 304, similar to second front axle 206 described above with reference to FIG. 2).

The first electric motor 306 and the second electric motor 308 may each be pancake motors having a diameter in a radial direction relative to the mounting axis 322 greater than a width in a direction parallel to the mounting axis 322. For example, the cylindrical section 339 of the first electric motor 306 may have a diameter 404 (shown by FIG. 4) and the width 328, with the diameter 404 being a greater amount of length than the width 328. Similarly, a diameter of the cylindrical section 341 of the second electric motor 308 may be greater than a width 326 of the cylindrical section 341.

In this configuration, an amount of space occupied by the first electric motor 306 and the second electric motor 308 within an engine compartment of the vehicle may be reduced. However, in other examples, the first electric motor 306 and/or second electric motor 308 may have a different shape (e.g., a different width and/or diameter) than the electric motors in the example shown by FIGS. 3-7. For example, the width of the cylindrical section of the first electric motor 306 may be greater than the diameter of the cylindrical section of the first electric motor 306, the width of the cylindrical section of the second electric motor 308 may be greater than the diameter of the cylindrical section of the second electric motor 308, one or both of the first electric motor and the second electric motor may have a non-cylindrical shape (e.g., rectangular), etc. However, in each example, the first electric motor 306 is directly coupled to the first exterior surface 307 and the second electric motor 308 is directly coupled to the second exterior surface 309 as described above.

In some examples, one or more engine mounts may be coupled to the engine block 313 in order to couple the engine 300 to a frame of the vehicle (e.g., frame 218 described above with reference to FIG. 2). For example, a first engine mount 500 (shown by FIGS. 5-7) may be directly coupled to the engine block 313 (e.g., via a plurality of fasteners, such as bolts) at the first side 334, and a second engine mount 704 (shown by FIG. 7) may be directly coupled to the engine block 313 at the second side 336. The first engine mount 500 and second engine mount 704 may be hydraulically actuated devices configured to increase an amount of damping of the engine (e.g., reduce an amount of vibrational motions transferred from the engine to the frame and/or to other components of the vehicle).

In other to further couple the electric motors to the engine 300, the first electric motor 306 and/or second electric motor 308 may include one or more angled arms shaped to couple with the engine mounts described above. For example, FIGS. 5-6 show an angled arm 502 of the housing 345 of the first electric motor 306 extending in a direction away from the central axis 343 of the cylindrical section 339 and away from the mounting axis 322 to couple with the first engine mount 500. Specifically, the angled arm 502 is positioned such that an aperture 503 formed by the angled arm 502 is aligned with a corresponding mounting feature 600 (shown partially by FIG. 6) of the engine mount 500. In some examples, the angled arm 502 may be coupled to the first engine mount 500 via a fastener (e.g., a bolt) inserted into both of the aperture 503 and the mounting feature 600, with the mounting feature 600 being an aperture formed by an exterior surface of the first engine mount 500. In other examples, the housing 345 of the first electric motor 306 may not be coupled to the first engine mount 500, or the housing 345 may be coupled to the first engine mount 500 in a different way (e.g., clamped, welded, etc.).

The second electric motor 308 may include an angled arm similar to the angled arm 502, and the angled arm of the second electric motor 308 may be coupled to the second engine mount 704 in a similar way (e.g., as described with reference to the first electric motor 306 coupled to first engine mount 500 by angled arm 502). In other examples, the second electric motor 308 may not be coupled to the second engine mount 704, or the angled arm of the second electric motor 308 may be coupled to the second engine mount 704 in a different way (e.g., clamped, welded, etc.). By coupling the first electric motor 306 to the first engine mount 500 via the angled arm 502, the first electric motor 306 may be more securely coupled to the engine 300. Similarly, coupling the second electric motor 308 to the second engine mount 704 as described above may more securely couple the second electric motor 308 to the engine 300.

FIGS. 3-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, by coupling the first electric motor and the second electric motor directly to the engine (e.g., to the oil pan), the vehicle is provided with a front-wheel drive system that occupies a decreased amount of space. The shorter axial width of the electric motors relative to the diameter of the electric motors enables each electric motor to be positioned between a respective reduction gearbox and the exterior surfaces of the engine, thereby decreasing an overall size of the front-wheel drive system. Coupling the electric motors directly to the engine via the arms and axial extensions further secures each electric motor into its corresponding position with respect to the engine. The arms of each electric motor extend in different directions to increase the length and height of an area at which each electric motor couples to the oil pan, thereby increasing a stability of each electric motor relative to the oil pan and preventing each electric motor from rotating relative to the engine. Additionally, by including the integrated starter/generator, the electric motors may be supplied electrical energy by the starter/generator during operation of the engine. The technical effect of energizing the electric motors via the starter/generator is to enable the electric motors to drive the front wheels of the vehicle during a wider variety of engine operating conditions.

As one embodiment, a system comprises: a longitudinally mounted engine adapted to drive rear wheels of a vehicle; and two, independent, electric motors mounted to the engine, on opposite sides of the engine, and adapted to drive front wheels of the vehicle, where the two electric motors are not rotationally coupled to the engine. In a first example of the system, the two electric motors each include a housing having a cylindrical section, and a width of the cylindrical section in a direction of a central axis of the cylindrical section and a latitudinal axis of the engine is less than a diameter of the cylindrical section. A second example of the system optionally includes the first example, and further includes wherein the two electric motors each include a plurality of arms extending in different outward directions from a housing of each electric motor, and wherein the plurality of arms mount the electric motors to the engine. A third example of the system optionally includes one or both of the first and second examples, and further includes wherein the two electric motors include a first electric motor mounted to an oil pan of the engine at a first side of the engine and a second electric motor mounted to the oil pan at a second side of the engine, with the first side being opposite to the second side relative to a longitudinal axis of the engine. A fourth example of the system optionally includes one or more or each of the first through third examples, and further includes wherein the oil pan is positioned along a longitudinal axis of the vehicle and a central vertical axis of the engine. A fifth example of the system optionally includes one or more or each of the first through fourth examples, and further includes wherein the oil pan includes a first plurality of mounting bosses formed by a first exterior surface at the first side and a second plurality of mounting bosses formed by a second exterior surface at the second side. A sixth example of the system optionally includes one or more or each of the first through fifth examples, and further includes wherein the first electric motor is coupled to the first plurality of mounting bosses and the second electric motor is coupled to the second plurality of mounting bosses. A seventh example of the system optionally includes one or more or each of the first through sixth examples, and further includes wherein the two electric motors include a first electric motor and a second electric motor, wherein a first reduction gearbox is coupled to the first electric motor between an output of the first electric motor and a first front axle shaft, and wherein a second reduction gearbox is coupled to the second electric motor between an output of the second electric motor and a second front axle shaft. An eighth example of the system optionally includes one or more or each of the first through seventh examples, and further includes wherein a length from a first end of the crankshaft to a second end of the crankshaft is positioned parallel to a longitudinal axis of the vehicle. A ninth example of the system optionally includes one or more or each of the first through eighth examples, and further includes an integrated starter motor/generator mechanically coupled to a crankshaft of the engine and electrically coupled to the two electric motors. A tenth example of the system optionally includes one or more or each of the first through ninth examples, and further includes a plurality of engine mounts coupling the engine to a frame of the vehicle, with each electric motor of the two electric motors coupled to a different engine mount of the plurality of engine mounts.

As another embodiment, a system comprises: twin, independent, electric motors mounted to either side of an exterior of an oil pan of a longitudinally mounted engine in a rear wheel drive vehicle; and twin reduction gearboxes, each reduction gearbox of the twin reduction gearboxes positioned between an output of one of the twin electric motors and one of two front axle shafts of front wheels of the rear wheel drive vehicle. In a first example of the system, the engine is mechanically coupled to rear wheels of the vehicle by a crankshaft of the engine, and the engine is not mechanically coupled to front wheels of the vehicle by the crankshaft. A second example of the system optionally includes the first example, and further includes a transmission coupled to the crankshaft of the engine, the transmission positioned along a longitudinal axis of the vehicle at a rear end of the engine. A third example of the system optionally includes one or both of the first and second examples, and further includes wherein the engine is a V-engine including two opposing cylinder banks, and wherein the electric motors are mounted to the exterior of the oil pan vertically below the cylinder banks relative to a surface on which the vehicle sits.

As another embodiment, a vehicle comprises: an engine including an engine block and an oil pan mounted to the engine block; two rear wheels driven by the engine; two front wheels not rotationally coupled to the engine; two, independent, electric motors, where each motor of the two electric motors drives a different one of the two front wheels and is coupled to an opposite, different side of each of the oil pan and the engine block; and two reduction gearboxes, each reduction gearbox coupled between and to each of an output of one of the two electric motors and one of the two front wheels. In a first example of the vehicle, each electric motor of the two electric motors includes a first plurality of arms extending in an outward direction away from a central axis of a cylindrical section of a housing of each electric motor. A second example of the vehicle optionally includes the first example, and further includes wherein each arm of the first plurality of arms includes an axial extension coupling the housing of each electric motor to the oil pan. A third example of the vehicle optionally includes one or both of the first and second examples, and further includes wherein each electric motor includes a second plurality of arms coupling the housing of each electric motor to engine mounts of the engine. A fourth example of the vehicle optionally includes one or more or each of the first through third examples, and further includes wherein each arm of the first plurality of arms extends across a length of the oil pan in a direction of a longitudinal axis of the engine and a height of the oil pan in a vertical direction relative to a ground surface on which the vehicle sits, and wherein each arm of the second plurality of arms extends in the vertical direction and is coupled to an engine mount of the engine.

In another representation, a system comprises: a longitudinally mounted engine adapted to drive rear wheels of a vehicle; an electric machine adapted to drive the rear wheels, the electric machine and engine selectably coupled to the rear wheels by a plurality of clutches; and two, independent, electric motors mounted to the engine, on opposite sides of the engine, and adapted to drive front wheels of the vehicle, where the two electric motors are not rotationally coupled to the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a longitudinally mounted engine adapted to drive rear wheels of a vehicle; and
two, independent, electric motors mounted to the engine, on opposite sides of the engine, and adapted to drive front wheels of the vehicle, where the two electric motors are not rotationally coupled to the engine.

2. The system of claim 1, wherein the two electric motors each include a housing having a cylindrical section, and wherein a width of the cylindrical section in a direction of a central axis of the cylindrical section and a latitudinal axis of the engine is less than a diameter of the cylindrical section.

3. The system of claim 1, wherein the two electric motors each include a plurality of arms extending in different outward directions from a housing of each electric motor, and wherein the plurality of arms mount the electric motors to the engine.

4. The system of claim 1, wherein the two electric motors include a first electric motor mounted to an oil pan of the engine at a first side of the engine and a second electric motor mounted to the oil pan at a second side of the engine, with the first side being opposite to the second side relative to a longitudinal axis of the engine.

5. The system of claim 4, wherein the oil pan is positioned along a longitudinal axis of the vehicle and a central vertical axis of the engine.

6. The system of claim 4, wherein the oil pan includes a first plurality of mounting bosses formed by a first exterior surface at the first side and a second plurality of mounting bosses formed by a second exterior surface at the second side.

7. The system of claim 6, wherein the first electric motor is coupled to the first plurality of mounting bosses and the second electric motor is coupled to the second plurality of mounting bosses.

8. The system of claim 1, wherein the two electric motors include a first electric motor and a second electric motor, wherein a first reduction gearbox is coupled to the first electric motor between an output of the first electric motor and a first front axle shaft, and wherein a second reduction gearbox is coupled to the second electric motor between an output of the second electric motor and a second front axle shaft.

9. The system of claim 8, wherein a length from a first end of a crankshaft to a second end of the crankshaft is positioned parallel to a longitudinal axis of the vehicle.

10. The system of claim 1, further comprising an integrated starter motor/generator mechanically coupled to a crankshaft of the engine and electrically coupled to the two electric motors.

11. The system of claim 1, further comprising a plurality of engine mounts coupling the engine to a frame of the vehicle, with each electric motor of the two electric motors coupled to a different engine mount of the plurality of engine mounts.

12. A system, comprising:
twin, independent, electric motors mounted to either side of an exterior of an oil pan of a longitudinally mounted engine in a rear wheel drive vehicle; and twin reduction gearboxes, each reduction gearbox of the twin reduction gearboxes positioned between an output of one of the twin electric motors and one of two front axle shafts of front wheels of the rear wheel drive vehicle.

13. The system of claim 12, wherein the engine is mechanically coupled to rear wheels of the vehicle by a crankshaft of the engine, and wherein the engine is not mechanically coupled to front wheels of the vehicle by the crankshaft.

14. The system of claim 13, further comprising a transmission coupled to the crankshaft of the engine, the transmission positioned along a longitudinal axis of the vehicle at a rear end of the engine.

15. The system of claim 12, wherein the engine is a V-engine including two opposing cylinder banks, and wherein the electric motors are mounted to the exterior of the oil pan vertically below the cylinder banks relative to a surface on which the vehicle sits.

16. A vehicle, comprising:
an engine including an engine block and an oil pan mounted to the engine block;
two rear wheels driven by the engine;
two front wheels not rotationally coupled to the engine;
two, independent, electric motors, where each motor of the two electric motors drives a different one of the two front wheels and is coupled to an opposite, different side of each of the oil pan and the engine block; and
two reduction gearboxes, each reduction gearbox coupled between and to each of an output of one of the two electric motors and one of the two front wheels.

17. The vehicle of claim 16, wherein each electric motor of the two electric motors includes a first plurality of arms extending in an outward direction away from a central axis of a cylindrical section of a housing of each electric motor.

18. The vehicle of claim 17, wherein each arm of the first plurality of arms includes an axial extension coupling the housing of each electric motor to the oil pan.

19. The vehicle of claim 18, wherein each electric motor includes a second plurality of arms coupling the housing of each electric motor to engine mounts of the engine.

20. The vehicle of claim 19, wherein each arm of the first plurality of arms extends across a length of the oil pan in a direction of a longitudinal axis of the engine and a height of the oil pan in a vertical direction relative to a ground surface on which the vehicle sits, and wherein each arm of the second plurality of arms extends in the vertical direction and is coupled to an engine mount of the engine.

* * * * *